United States Patent [19]

Bierschenk

[11] Patent Number: 4,631,200

[45] Date of Patent: Dec. 23, 1986

[54] GRAPHITE COMPOSITE CHIPS

[75] Inventor: Thomas R. Bierschenk, Round Rock, Tex.

[73] Assignee: The Dow Chemical Company, Midland, Mich.

[21] Appl. No.: 734,996

[22] Filed: May 17, 1985

[51] Int. Cl.$^4$ .......................... B05D 3/02; B05D 5/12
[52] U.S. Cl. ................................ 427/113; 204/290 R; 204/294; 427/115; 427/385.5; 427/221
[58] Field of Search ............ 427/113, 115, 122, 385.5, 427/221; 204/294, 290 R

[56] References Cited

U.S. PATENT DOCUMENTS

| | | | |
|---|---|---|---|
| 4,354,958 | 10/1982 | Solomon | 204/294 X |
| 4,457,953 | 7/1984 | McIntyre et al. | 427/113 |
| 4,459,197 | 7/1984 | Solomon | 204/294 X |

*Primary Examiner*—Michael R. Lusignan

*Attorney, Agent, or Firm*—Glynn R. Baker

[57] ABSTRACT

For use in trickle bed electrolytic cells, the preferred and illustrated embodiment sets forth an improved graphite composite chip. It is a chip characterized by having a much higher percentage with a more uniform coating thereon. The coating has the form of a mix of carbon and Teflon on graphite chips. It is more uniform and applied to both sides of the chips. This improves current flow and distribution in an electrolytic cell such as a hydrogen peroxide cell. One procedure taught herein is a method of making such composite chips on graphite wherein carbon in particulate form is mixed with water and particulate Teflon dispersion and is added to graphite chips of a selected mesh size; after mixing, the water is drained and all water is removed by a vacuum in a rotary evaporator whereupon the dried material is then sintered for a specified time and temperature.

8 Claims, No Drawings

GRAPHITE COMPOSITE CHIPS

BACKGROUND OF THE DISCLOSURE

An electrolytic cell of a size suitable for commercial processing involves a substantial current flow at the electrode within the cell in the presence to a vigorous chemical reaction. The materials used to fabricate the electrolytic cell are therefore degraded by two important factors mainly, a substantial current flow and extremely high chemical activity typically occurring at temperatures above ambient.

One such electrolytic cell is exemplified by a hydrogen peroxide cell. This involves a packed bed cathode within a suitable container, the cathode being formed of graphite chips. It is particularly important to obtain a coating on the chips which increases the efficiency of the packed bed cathode. The procedure of this disclosure sets forth a means of obtaining such a product, namely a graphite chip which has a composite layer on both sides which is substantially uniform in thickness. The layer is formed of particulate carbon and Teflon uniformly applied. At the time of processing, the slurry of carbon and Teflon (in particulate form) is applied to the individual chips, the chips being dried whereby a coating is formed on them. Moreover, this enables a chip which has an improved uniform coating able to handle the current flow required in the packed bed cathode. This is useful in prolonging the life of the cathode bed and to sustain relatively high performance for the cathode bed electrode. Further, this avoids chip degradation by enabling a more broadly distributed current flow, thereby eliminating current concentration at hot spots which degrade the chips comprising the trickle bed electrode.

While an individual chip may be degraded, even destroyed by the current flow concentration arising in the presence of the high chemical activity normal for an electrode bed, the loss of one chip is not immediately noticeable. However, the loss of chips is cumulative and degrades performance of the packed bed cathode, requiring more rapid replacement. Moreover, degradation of the bed may well also degrade the products obtained from the electrolytic process occurring in the electrolytic packed bed cell.

With the foregoing in view, the present disclosure is described as a method for the manufacture of a coated graphite chip suitable for use in a particulate chip cathode used in a packed bed electrolytic cell. The method of fabrication includes formation of a water slurry having graphite chips therein. A mix of particulate carbon and Teflon dispersion in the water is applied to the graphite chips which are subsequently dried in a rotary evaporator aided with vacuum removal, whereupon the chips are sintered for a specified time and temperature.

DETAILED DESCRIPTION OF THE PREFERRED PROCEDURE

The procedure of this disclosure is for the manufacture of a composite chip. A composite chip is one which is suitable for use in a packed bed cathode in an electrolytic cell. Such a cell is typified by a hydrogen peroxide cell. In a suitable cell, the composite chips are collectively formed into a packed bed cathode which is made up of the composite chips for conducting electric current flow.

As a suitable basis for setting forth the description, laboratory size quantities are described. The exemplary quantities can be scaled to larger numbers as desired.

Particulate carbon is washed in a suitable strong acid to remove metal. To assure that the carbon is pure carbon, it is preferably washed in about 30% hydrogen chloride, accompanied by suitable stirring for about one hour whereupon the carbon is filtered, rinsed and dried. Preferably, the carbon is in particulate form having particles typically smaller than about 400 mesh. Approximately 2.75 grams of such carbon is then mixed with about 4 cc of a 72% Teflon dispersion in 250 cc of water. This is accomplished in a clean container. The Teflon dispersion includes Teflon particles which are in the range of about one micron diameter. In addition, about 75 grams of graphite chips are mixed into the water. The chips are typically encompassed in a range of between about $-10$ to $+20$ mesh. After suitable agitation to assure mixing of the graphite particles and Teflon dispersion in the water, the material is emptied from a container into a rotary evaporator. The rotary evaporator is raised to a temperature of about 50° C. in vacuum. The rotary evaporator is continuously spun to dry the chips. After drying whereupon substantially all the water has been removed, the temperature in the rotary evaporator is raised to about 100° C., or slightly thereabove to assure that all the water has been boiled off. This, of course, is aided by operating the rotary evaporator at a significant vacuum. Typically, a vacuum in the range of about $10^{-1}$ torr is more than sufficient.

The chips are placed in a suitable container to be sintered for about one hour at 360° C. After this has been accomplished for about one hour, the chips are then cooled to approximate room temperature. After they have been cooled slowly to room temperature, the chips are then removed, and to assure an improved coating, the foregoing process is again repeated on the same chips. That is, the processing steps involving placing 2.75 grams of particulate carbon, and 4 cc of 72% Teflon dispersion in water is again repeated. The same quantity of water is used, and the chips (having been coated once through this procedure) are again deposited in the water for the same sequence. In other words, the treatment steps used on the chips are repeated preferably twice or even three times if desired. The only difference is that the second sequence of treatment involves the chips that were treated previously in the first step, accompanied by the addition of three drops of a surfactant. A suitable surfactant is Triton X-100. Again, the same vacuum rotary drying sequence is used whereupon the chips are again sintered. After processing, the composite chips are then ready to be used as the cathode in a packed bed electolytic cell.

Comparing the chip of this process with a chip previously used successfully, wherein the chips were spread over a surface (in quantites exceeding 200 chips) and through the use of suitable instrumentation to make such mesurements, the thickness of the material on the chips was measured. The number of chips having no coating was about 5% while the number of chips obtained from another process with no coating where approximately three times that quantity. Moreover, the coating thickness (measured perpendicular to the supportive surface on which the chips rest and hence substantially perpendicular to the chips themselves) was, after two coatings (described in the preferred sequence above), an average thickness of about 90 microns. This compared favorably to the chips from the alternate source which had a coating thickness of an average of about 60 microns. Yet, the range of coating from minumum to maximum was tighter by perhaps 270 microns to 370 microns. It will be understood that the wider thickness range is not particularly desirable; because the chips are used in great quantity in a composite arrangement, hot spot formation is a defused but nevertheless damaging problem in use.

Accordingly, the chips provided with two coatings (two applications of graphite and Teflon) are believed to have a more uniform and thicker coating with a tightened range between maximum and minimum coating, and with significantly reduced uncoated chips. As will be understood, Teflon is only one of a family of fluorocarbons more specifically characterized as halogenated long chain polymers which particularly find application in this regard. Accordingly, suitable materials used in the dispersion include not only Teflon (a trademarked item of DuPont) but also include, as an example, chlorotrifluoroethylene and hexafluoropropylene.

While the foregoing is directed to the preferred method of the present invention, other and further methods of the invention may be devised without departing from the basic invention thereof, and the scope thereof is determined by the claims which follow.

What is claimed is:

1. A method for making composite chips for use in packed bed electrolytic cells featuring a uniform coating of carbon and Teflon on graphite chips wherein the method comprises:

(a) preliminarily washing particulate carbon with a metal removing wash;
    (b) mixing the washed particulate carbon with a fluorocarbon dispersion in water and adding thereto graphite chips having a specified mesh;
    (c) removing the water until dry; and
    (d) sintering the dried material at an elevated temperature for a specified interval wherein the coating material is applied to an average thickness of about 90 microns on about 95% or more of the graphite chips so treated.

2. The method of claim 1 including applying a second application of carbon and fluorocarbon dispersed in water on graphite chips after a first application.

3. The method of claim 2 including the step of adding a small quantity of surfactant to the water for the second application.

4. The method of claim 1 wherein the preliminary step of washing the carbon uses 30% hydrochloric acid for about one hour, thereafter filtering, rinsing and drying the carbon to remove metal therefrom.

5. The method of claim 1 wherein the carbon is approximately 2.75 grams of carbon, and the fluorocarbon dispersion is about 4 cc of 70% Teflon, and both are mixed in a suitable quantity of water.

6. The method of claim 5 wherein about 75 grams of graphite are mixed in the water, the graphite having a mesh between about −10 and about +20.

7. The method of claim 1 wherein the step of removing water under vacuum involves rotary spinning in vacuum at an elevated temperature reaching about 100° C.

8. The method of claim 1 including the step of sintering to about 350° for about one hour.

* * * * *